United States Patent
Kim

(10) Patent No.: US 7,651,122 B2
(45) Date of Patent: Jan. 26, 2010

(54) APPARATUS FOR LEADING TO NORMAL TEARING OF INSTRUMENT PANEL HAVING BUILT-IN PASSENGER AIR BAG

(75) Inventor: Hyun Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/238,734

(22) Filed: Sep. 26, 2008

(65) Prior Publication Data

US 2009/0289442 A1    Nov. 26, 2009

(30) Foreign Application Priority Data

May 23, 2008    (KR) ...................... 10-2008-0047884

(51) Int. Cl.
*B60R 21/16* (2006.01)
(52) U.S. Cl. .................... 280/728.3; 280/732
(58) Field of Classification Search .............. 280/728.3, 280/732, 730.2
See application file for complete search history.

(56) References Cited

U.S. PATENT DOCUMENTS

| | | | | |
|---|---|---|---|---|
| 4,148,503 A | * | 4/1979 | Shiratori et al. | ............. 280/731 |
| 4,991,870 A | * | 2/1991 | Beusterien et al. | .......... 280/732 |
| 5,080,393 A | * | 1/1992 | Dixon et al. | ................. 280/732 |
| 5,590,901 A | * | 1/1997 | MacGregor | .............. 280/728.3 |
| 5,797,619 A | * | 8/1998 | Bauer et al. | .............. 280/728.3 |

* cited by examiner

*Primary Examiner*—Eric Culbreth
(74) *Attorney, Agent, or Firm*—Morgan, Lewis & Bockius LLP

(57) ABSTRACT

An apparatus for leading to normal tearing of an instrument panel having a built-in passenger air bag (PAB). The apparatus includes an instrument panel having an air bag module located thereinside, a tear line formed on the instrument panel in a predetermined shape such that the air bag easily comes out of the instrument panel when deployed, and a heating device installed inside the instrument panel so as to heat a surrounding area of the tear line and at least one predetermined area of the instrument panel which acts as a hinge section when the air bag is deployed.

12 Claims, 6 Drawing Sheets

APPARATUS FOR LEADING TO NORMAL TEARING OF INSTRUMENT PANEL HAVING BUILT-IN PASSENGER AIR BAG

CLAIM OF PRIORITY

This application claims the benefit of Korean Patent Application No. 10-2008-0047884 filed on May 23, 2008, in the Korean Intellectual Property Office, the disclosure of which is incorporated herein by reference.

BACKGROUND OF THE INVENTION

1. Field of the Invention

The present invention relates to an apparatus for leading to normal tearing of an instrument panel having a built-in passenger air bag (PAB) and, more particularly, to an apparatus for leading to normal cutting of an instrument panel having a built-in PAB, in which, when the PAB is deployed in a low-temperature environment, the instrument panel is generally torn along a tear line without brittle fracture, and particularly a hinge section of the instrument panel is prevented from being exfoliated or splintered.

2. Description of the Related Art

Generally, an air bag is an apparatus that is installed on a driver seat and a passenger seat in order to protect a driver and a passenger. The air bag for the driver seat is designed to be deployed from a steering wheel, whereas the air bag for the passenger is designed to be deployed from an instrument panel, at a predetermined position of which an air bag door is installed and opened toward the passenger.

The air bag for the passenger (or briefly called passenger air bag (PAB)), which is installed in order to protect the occupant of the passenger seat, is mounted on a motor vehicle in the state of an air bag module including an inflator. The air bag door, which is installed in the instrument panel such that the air bag is to be deployed toward the passenger, is called an invisible door that is not be able to be seen in order to improve an exterior view. This invisible door has a tear-off line (hereinafter, referred to as a "tear line") notched in the instrument panel at a predetermined depth using a laser so as to define a boundary thereof. The air bag door is not separately installed on the instrument panel. In detail, when the tear line is formed in the instrument panel itself using the laser, the instrument panel itself having the tear line serves as the air bag door.

Thus, when the air bag is deployed from the interior of the instrument panel, the air bag door is torn along the tear line by volume expansion of the air bag, and then the air bag comes out of the instrument panel. At this time, in the case of the area such as North America where a low-temperature environment is dominant, a temperature at the instrument panel is very low. As such, when the instrument panel is pressed by the inflating air bag, the tear line is not torn as it stands. In detail, the instrument panel undergoes brittle fracture, so that a tear-off face thereof becomes sharp or that splinters thereof are thrown toward the passenger.

Thus, as illustrated in FIGS. 1 through 3, there has been proposed an apparatus for preventing the brittle fracture of the instrument panel.

FIG. 1 illustrates the configuration of a conventional apparatus for preventing brittle fracture of an instrument panel. FIG. 2 is a cross-sectional view illustrating the structure of an instrument panel in which a PAB is installed. FIG. 3 schematically illustrates arrangement of a tear line and a heater, both of which are formed on a conventional instrument panel.

First, as illustrated in FIGS. 1 and 2, the instrument panel 10 is located under the windshield of a motor vehicle, and particularly in front of a passenger seat. An air bag module 1 causing volume expansion by means of an electrical signal is installed in the instrument panel 10.

As illustrated, a tear line 20 having a "U" shape is formed on the instrument panel 10 such that the air bag module 1 can easily break through the instrument panel 10 in an outward direction during the volume expansion.

Further, a heater 30 is installed inside the instrument panel 10 spaced apart from the tear line 20 by a predetermined interval such that the tear line 20 can be easily torn in a low-temperature environment.

The heater 30 is operated by a controller 50, which receives the signal of temperature at the instrument panel 110 from a temperature detector 40 located in the middle of the tear line 20. When the temperature of the instrument panel 10 is lower than a preset temperature, the controller 50 supplies the heater 30 with electrical power so as to heat a surrounding area of the tear line 20. Thereby, when the tear line 20 is torn off by pressure of the air bag, the instrument panel is neatly and clearly torn along the tear line without brittle fracture.

In this manner, the surrounding area A of the tear line 20 at which the heater 30 is installed is torn when the air bag is deployed, and the other area of the instrument panel 10 at which the tear line 20 is not installed acts as a hinge section B. Part of the instrument panel 10, which is torn along the tear line 20, is folded around the hinge section B in an outward direction, and then the air bag is deployed outwardly.

However, as illustrated in FIG. 3, since the heater 30 is not installed on the hinge section B of the instrument panel 10, and since the heat of the heater 30 is not transmitted to the hinge section B, the hinge section B continues to be under low temperature unlike the surround area A of the tear line 20. Thus, when the air bag is deployed, the hinge section B is folded but the hinge section B is exfoliated, and the resultant splinters are pinched toward the passenger, and cause damage to the passenger.

SUMMARY OF THE INVENTION

Embodiments of the present invention has been made to solve the foregoing problems with the prior art, and therefore the present invention is directed to inhibit at least one hinge section of an instrument panel from being exfoliated or splintered when the instrument panel having a tear line is torn along the tear line in a low-temperature environment.

According to an aspect of the invention, there is provided an apparatus for leading to normal tearing of an instrument panel having a built-in passenger air bag.

In an exemplary embodiment of the present invention, the apparatus may include the instrument panel having a built-in passenger air bag module located thereinside; a tear line formed on the instrument panel in a predetermined shape such that an air bag easily comes out of the instrument panel when deployed; and a heating means installed inside the instrument panel, and heating a surrounding area of the tear line and at least one predetermined area of the instrument panel which acts as a hinge section when the air bag is deployed. The tear line may be bent twice in one direction. The tear line may have a shape in which opposite ends thereof are forked. The heating means may have a strip pattern enclosing the tear line, and a pattern distributed over the hinge sections for the tear line. In addition, the heating means may be operated by a controller, which receives a signal of temperature at the instrument panel only when the temperature of the instrument panel is lower than a preset temperature.

In another exemplary embodiment of the present invention, the apparatus for leading to normal tearing of an instrument panel may comprise: the instrument panel having a built-in passenger air bag module located thereinside; a tear line formed on the instrument panel in a predetermined shape such that an air bag easily comes out of the instrument panel when deployed; and a heating means installed inside the instrument panel so as to heat at least one predetermined area of the instrument panel which acts as a hinge section when the air bag is deployed. The tear line may have one of a shape bent twice in one direction and a shape in which opposite ends thereof are forked. In addition, the heating means may be operated by a controller, which receives a signal of temperature at of the instrument panel only when the temperature of the instrument panel is lower than a preset temperature.

In further another exemplary embodiment of the present invention, the apparatus for leading to normal tearing of an instrument panel, may comprise: the instrument panel having a built-in passenger air bag module located thereinside; a tear line formed on the instrument panel in a predetermined shape such that an air bag easily comes out of the instrument panel when deployed; and a heating means installed inside the instrument panel and heating an area surrounding the tear line and at least one predetermined area of the instrument panel which acts as a hinge section when the air bag is deployed. The preset temperature may be about −20° C. the tear line bent is bent at least once and have a continuous shape. The tear line bent may be formed of a substantially closed shape and a portion of the tear line bent may substantially enclose the predetermined area which acts as a hinge section when the air bag is deployed. The tear line bent may be formed of an open shape. The heating means may have a strip pattern enclosing the tear line, and a pattern distributed over the hinge sections for the tear line. In addition, the heating means may be operated by a controller, which receives a signal of temperature at of the instrument panel only when the temperature of the instrument panel is lower than a preset temperature.

According to the present invention, when the air bag is deployed in a low-temperature environment, the hinge section of the instrument panel is smoothly folded, and thus is safe from exfoliation or splintering. Thus, a possibility of doing an injury to the passenger is reduced.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EXEMPLARY EMBODIMENT

Now, exemplary embodiments of the present invention will be described in detail with reference to the accompanying drawings.

Figure 1:
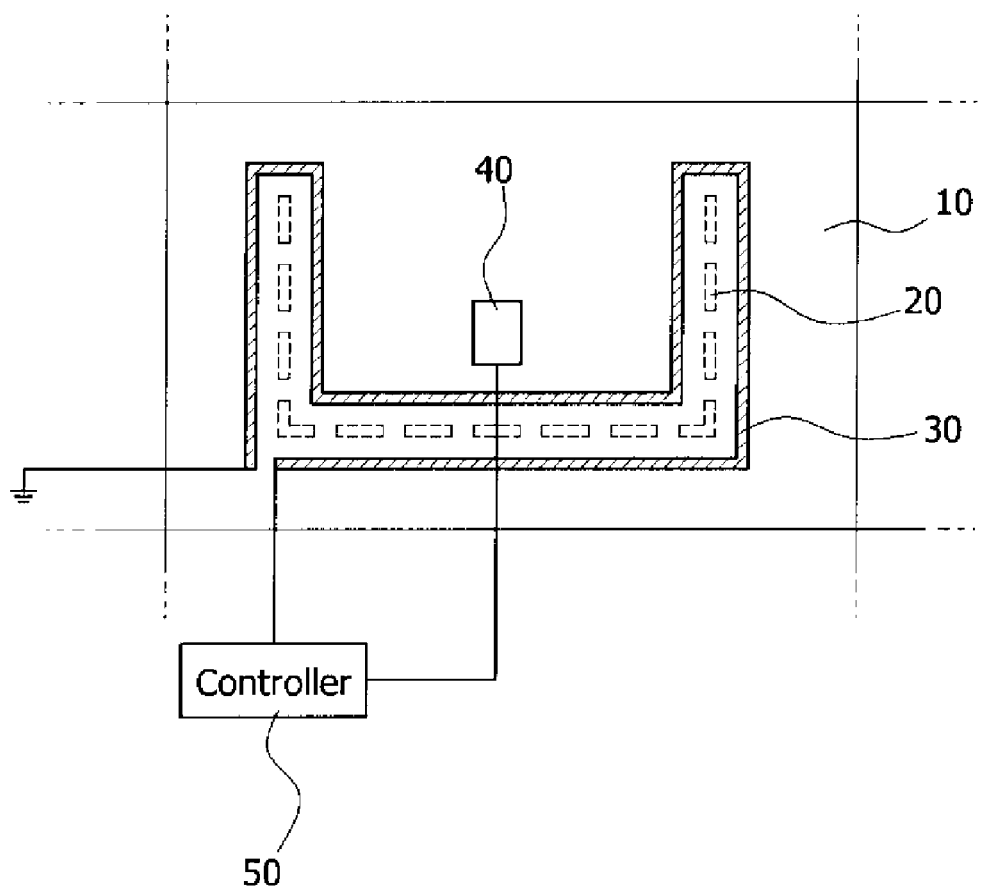
FIG. 1 illustrates the configuration of a conventional apparatus for preventing brittle fracture of an instrument panel.
Figure 2:
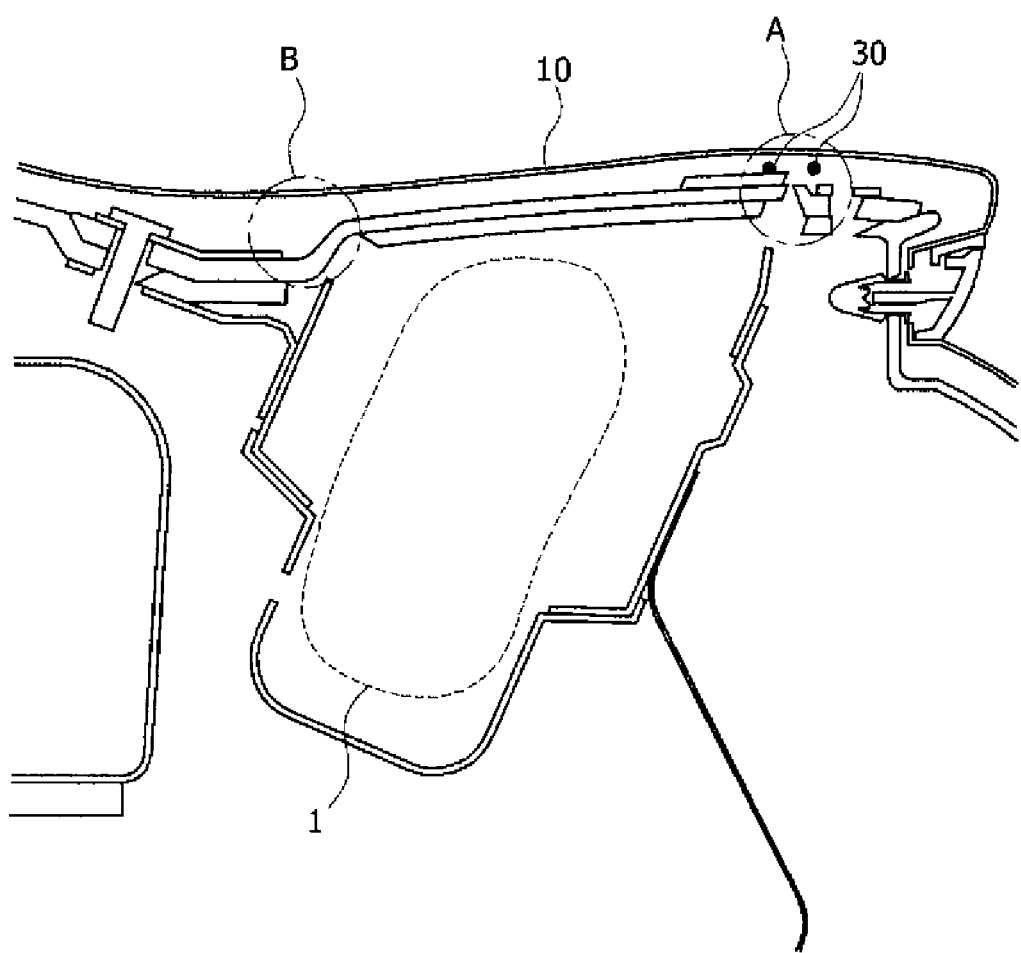
FIG. 2 is a cross-sectional view illustrating the structure of an conventional instrument panel in which a passenger air bag (PAB) is installed.
Figure 3:
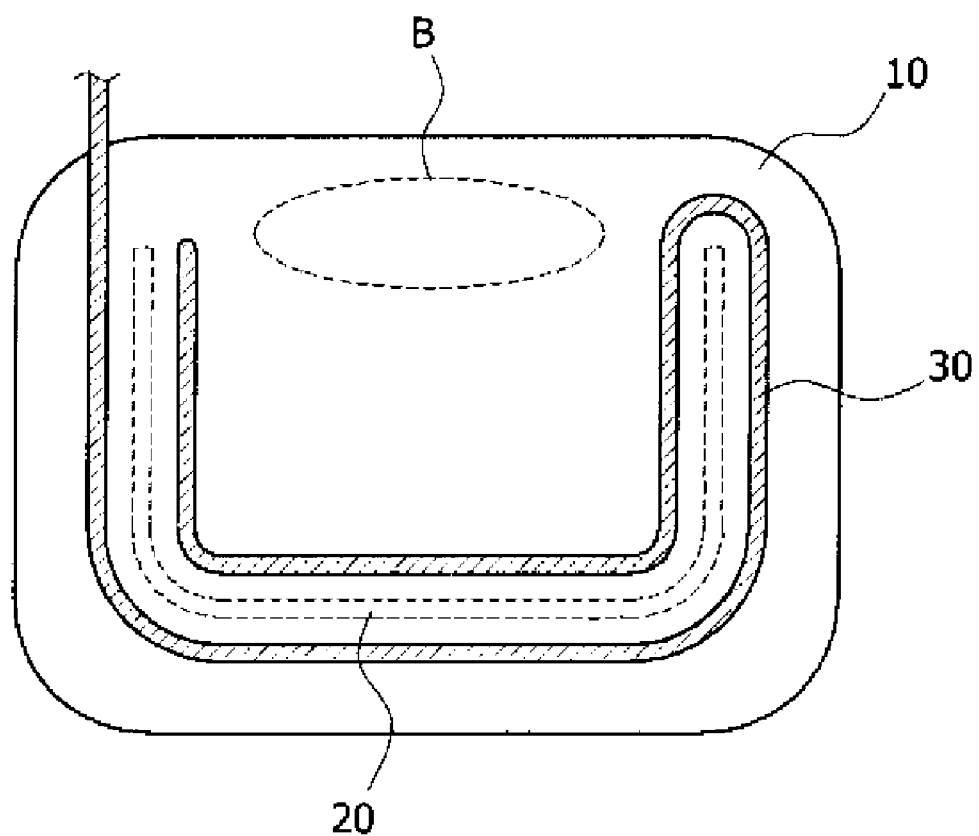
FIG. 3 schematically illustrates arrangement of a tear line and a heater, both of which are formed on a conventional instrument panel.
Figure 4:
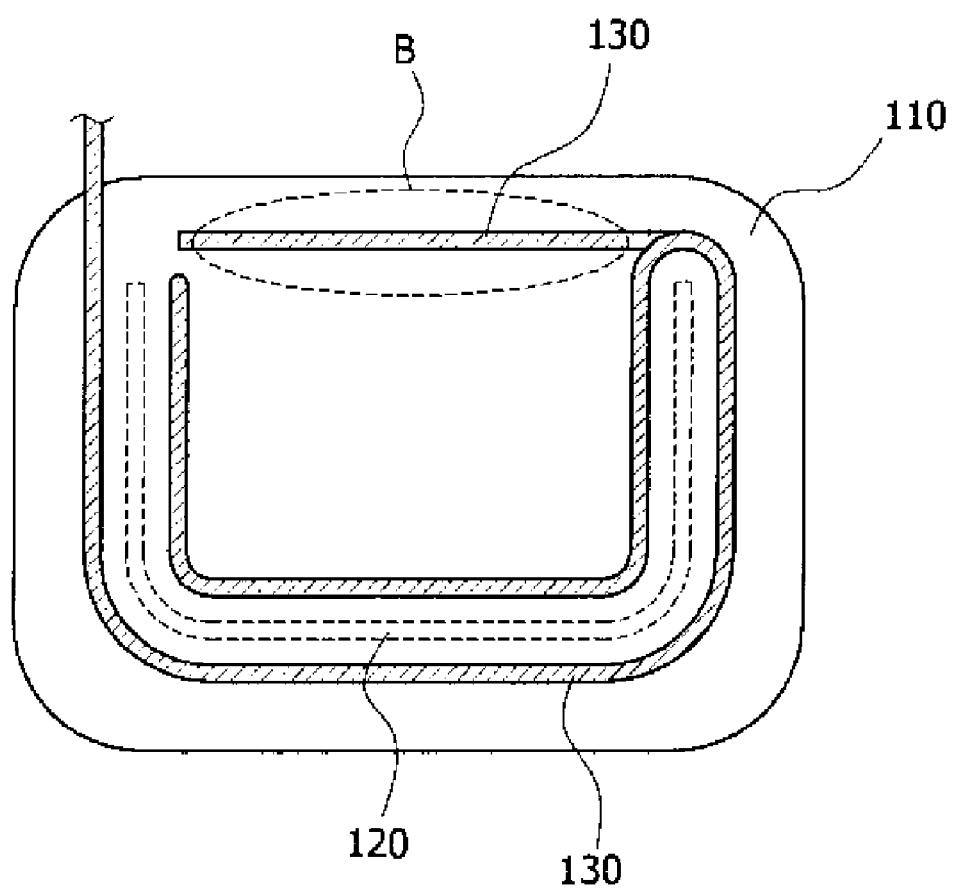
FIG. 4 is a schematic view illustrating arrangement of an apparatus for leading to normal tearing of an instrument panel having a built-in PAB according to an exemplary embodiment of the present invention.
Figure 5:
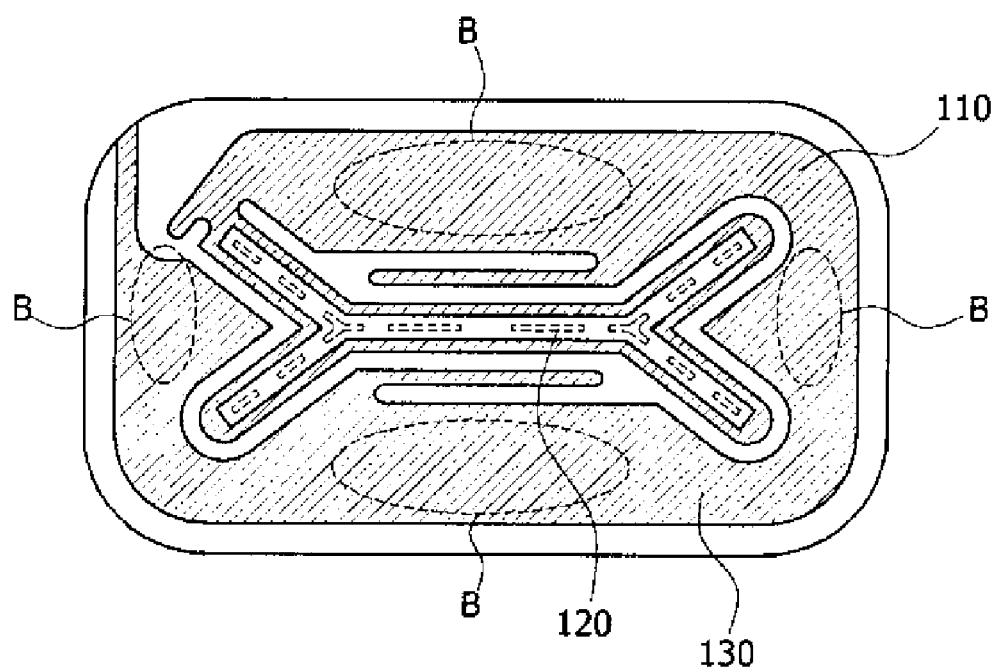
FIG. 5 is a schematic view illustrating arrangement of an apparatus for leading to normal tearing of an instrument panel having a built-in PAB according to another exemplary embodiment of the present invention.
Figure 6:
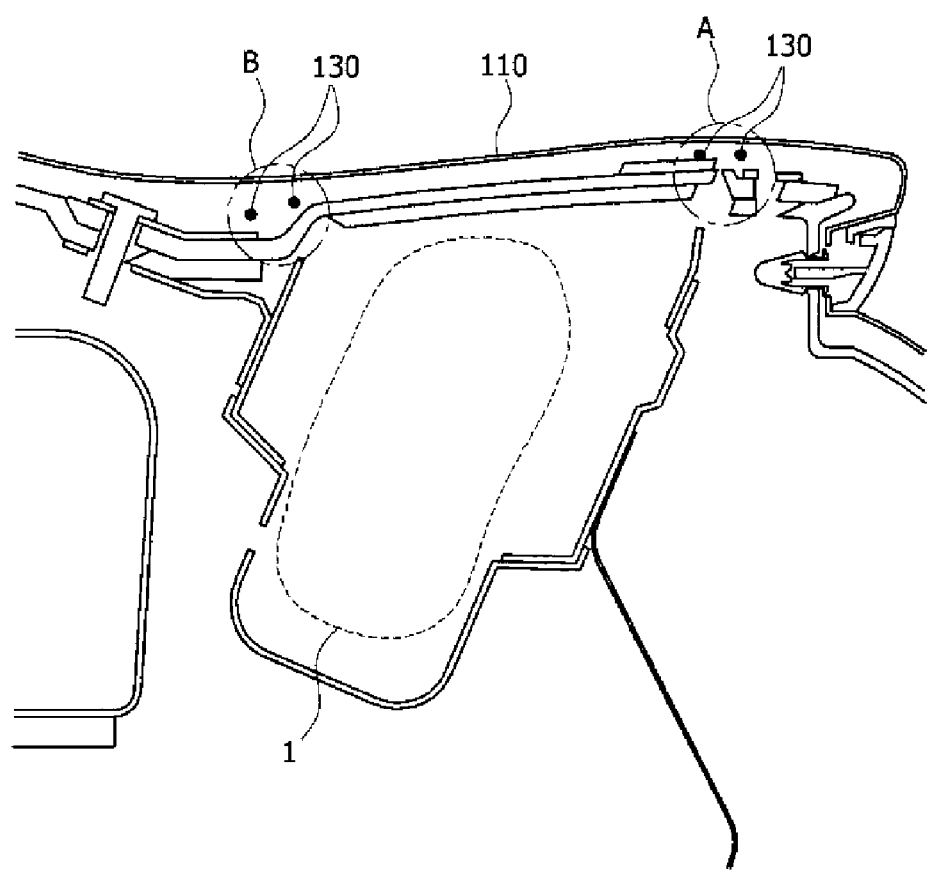
FIG. 6 is a cross-sectional view illustrating an instrument panel in which a PAB is installed according to an exemplary embodiment of the present invention.

FIG. 4 is a schematic view illustrating arrangement of an apparatus for leading to normal tearing of an instrument panel having a built-in passenger air bag (PAB) according to an exemplary embodiment of the present invention. FIG. 5 is a schematic view illustrating arrangement of an apparatus for leading to normal tearing of an instrument panel having a built-in PAB according to another exemplary embodiment of the present invention. FIG. 6 is a cross-sectional view illustrating an instrument panel in which a PAB is installed according to the present invention.

As illustrated, an exemplary embodiment of the present invention is directed to an apparatus for leading to normal tearing of an instrument panel having a built-in PAB, which generally includes the instrument panel 110, a tear line 120, and a heating means 130.

The instrument panel 110 is a panel that is located in front of a passenger seat under the windshield of a motor vehicle. As illustrated in FIG. 6, an air bag module 1, which causes an air bag to be inflated by an electrical signal, is located inside the instrument panel 110.

Meanwhile, the instrument panel 110 is provided thereon with a tear line 120 in a predetermined shape such that the air bag can easily come out of the instrument panel 110 when deployed from the air bag module 1.

Thus, as the air bag is inflated, the instrument panel 110 is pressurized upwardly by the inflated air bag. Due to this pressure, the tear line 120 of the instrument panel 110 is torn in a preset shape, and thus the air bag easily comes out of the instrument panel 110.

In an exemplary embodiment of the present invention, the heating means 130 is installed inside the instrument panel 110 such that the tear line 120 can be easily torn in a low-temperature environment of about −20° C. The heating means 130 heats the surroundings of the tear line 120 together with part of the instrument panel 110 which acts as a hinge section B when the air bag is deployed.

In other words, as illustrated in FIG. 4, the heating means 130 heats the surroundings of the tear line 120 as well as the part of the instrument panel 110 which acts as the hinge section B when turned over by tearing of the tear line 120. Thereby, the hinge section B of the instrument panel 110 is prevented from being exfoliated when the air bag is deployed, and thus splinters are prevented from being generated by such exfoliation.

In addition, the heating means 130 can be installed only on the part of the instrument panel 110 which acts as the hinge section B. This is for heating only the hinge section B in the situation where the tear line 120 is generally torn without being heated, thereby inhibiting the exfoliation of the hinge section B or generation of the splinters.

According to a test, it was analyzed that the exfoliation and the splinters were generated from the hinge section B of the instrument panel 110 when the instrument panel 110 was subjected to instantaneous bending load at very low temperature. Thus, the hinge section B of the instrument panel 110 is preferably heated so as to be easily turned over when the air bag is deployed.

According to an embodiment of the present invention as illustrated in FIG. 4, the tear line 120 is bent at least twice in the same direction. This bent shape includes a "U" shape, and a shape in which the "U" shape is rotated in a clockwise direction at an angle of 90°, 180° or 270°. The bent angle is not limited to a right angle, and thus includes an acute angle and an obtuse angle.

When the tear line 120 is formed in this way, the heating means 130 is also installed along the tear line 120 with the tear line 120 substantially enclosed as illustrated in FIG. 4. Particularly, the heating means 130 is installed on the hinge section B such that the hinge section B is heated. Thus, the heating means 130 has an approximately "square" shape as an exemplary embodiment.

Meanwhile, according to another embodiment of the present invention as illustrated in FIG. 5, the tear line 120 has a shape ">-<" in which opposite ends thereof are forked. When the tear line 120 is formed in this shape, the instrument panel 110 is generally split into four parts when the air bag is deployed. As such, the instrument panel 110 is also provided with four hinge sections B.

Thus, the heating means 130 has a strip pattern enclosing the tear line 120, as well as a pattern distributed over the hinge sections B for the tear line 120.

Here, the heating means 130 is preferably operated by a controller, which receives the signal of temperature at the instrument panel 110 having the tear line 120, only when the temperature of the instrument panel 110 is lower than a preset temperature.

In detail, the heating means 130 is heated by electrical power supplied by the controller. The controller detects the temperature of the instrument panel 110 by means of a temperature sensor installed on the instrument panel 110, and then controls the heating means 130 to be heated when the temperature of the instrument panel 110 becomes lower than a preset temperature (e.g. −20° C.).

At this time, the heating means 130 is not limited to its type. For example, a heating coil or a heating sheet may be used as the heating means 130. Particularly, according to another embodiment of the present invention as illustrated in FIG. 5, the heating sheet is preferable because it is advantageous for a wide area.

In this manner, the heating means 130, as an exemplary embodiment of the present invention is installed around the tear line 120 as well as on the hinge section B of the instrument panel 110. Thus, as illustrated in FIG. 6, when the air bag is inflated from the air bag module 1 inside the instrument panel 110, the tear line 120 is neatly torn in a predetermined shape, and the hinge section B is smoothly turned over without causing the exfoliation or the splinters.

While the present invention has been described with reference to the particular illustrative embodiments and the accompanying drawings, it is not to be limited thereto. Accordingly, the foregoing embodiments can be suitably modified and altered, and such applications fall within the scope and spirit of the present invention that shall be defined by the appended claims.

What is claimed is:

1. An apparatus for leading to normal tearing of an instrument panel, comprising:
   the instrument panel having a built-in passenger air bag module located thereinside;
   a tear line formed on the instrument panel in a predetermined shape such that an air bag easily comes out of the instrument panel when deployed; and
   a heating means installed inside the instrument panel so as to heat at least one predetermined area of the instrument panel which acts as a hinge section when the air bag is deployed,
   wherein the heating means is operated by a controller, which receives a signal of temperature at the instrument panel, only when the temperature of the instrument panel is lower than a preset temperature.

2. The apparatus according to claim 1, wherein the tear line has one of a shape bent twice in one direction and a shape in which opposite ends thereof are forked.

3. An apparatus for leading to normal tearing of an instrument panel, comprising:
   the instrument panel having a built-in passenger air bag module located thereinside;
   a tear line formed on the instrument panel in a predetermined shape such that an air bag easily comes out of the instrument panel when deployed; and
   a heating means installed inside the instrument panel and heating an area surrounding the tear line and at least one predetermined area of the instrument panel which acts as a hinge section when the air bag is deployed,
   wherein the heating means is operated by a controller, which receives a signal of temperature at the instrument panel, only when the temperature of the instrument panel is lower than a preset temperature.

4. The apparatus according to claim 3, wherein the tear line is bent twice in one direction.

5. The apparatus according to claim 3, wherein the tear line has a shape in which opposite ends thereof are forked.

6. The apparatus according to claim 5, wherein the heating means has a strip pattern enclosing the tear line, and a pattern distributed over the hinge section for the tear line.

7. The apparatus according to claim 3, wherein the preset temperature is about −20° C.

8. The apparatus according to claim 7, wherein the tear line bent is bent at least once and have a continuous shape.

9. The apparatus according to claim 8, wherein the tear line bent is formed of a substantially closed shape.

10. The apparatus according to claim 9, wherein a portion of the tear line bent substantially encloses the predetermined area which acts as a hinge section when the air bag is deployed.

11. The apparatus according to claim 8, wherein the tear line bent is formed of an open shape.

12. The apparatus according to claim 11, wherein the heating means has a strip pattern enclosing the tear line, and a pattern distributed over the hinge section for the tear line.

* * * * *